Sept. 8, 1959 W. A. MAUDE 2,903,321
CONDITION RESPONSIVE APPARATUS
Filed Feb. 21, 1955 6 Sheets-Sheet 1

Inventor:
William A. Maude
by, Richard E. Hosley
His Attorney

Sept. 8, 1959 W. A. MAUDE 2,903,321
CONDITION RESPONSIVE APPARATUS
Filed Feb. 21, 1955 6 Sheets-Sheet 2

Inventor:
William A. Maude
by, *Richard E. Hesley*
His Attorney

Sept. 8, 1959 W. A. MAUDE 2,903,321
CONDITION RESPONSIVE APPARATUS
Filed Feb. 21, 1955 6 Sheets-Sheet 3

Inventor:
William A. Maude
by, Richard E. Hosley
His Attorney

Sept. 8, 1959 W. A. MAUDE 2,903,321
CONDITION RESPONSIVE APPARATUS
Filed Feb. 21, 1955 6 Sheets-Sheet 4

Inventor:
William A. Maude
by, Richard E Horley
His Attorney

Sept. 8, 1959  W. A. MAUDE  2,903,321
CONDITION RESPONSIVE APPARATUS

Filed Feb. 21, 1955  6 Sheets-Sheet 6

Inventor:
William A. Maude
by. Richard E. Hosley
His Attorney

United States Patent Office 2,903,321
Patented Sept. 8, 1959

2,903,321

CONDITION RESPONSIVE APPARATUS

William A. Maude, Lynn, Mass., assignor to General Electric Company, a corporation of New York Application February 21, 1955, Serial No. 489,331

3 Claims. (Cl. 346—17)

This invention relates generally to condition responsive apparatus that is operative to indicate and record any changes in magnitude of a condition and which may be adapted to operate initiating components of a control system arranged to maintain a predetermined magnitude of such condition. More specifically, the invention relates to such apparatus that is basically applicable to a wide variety of condition controlling systems wherein a major portion of the apparatus comprises a standard assembly that is readily adaptable and convertible for specific control applications. Such apparatus is often referred to as a recording controller, and this term will be used throughout as a convenient designation of the broad combination embraced by this invention.

In modern industry there is an ever-increasing demand for virtually completely automatic systems for controlling complicated industrial processes, and such systems usually embody recording and controller units operating to respond to the process and supervise its action. For example, in any process involving the operation of a furnace, it is usually essential to control the temperature within the furnace and, in the case of a thermocouple detector unit, the detector will operate to generate an electrical quantity in the form of a small output voltage varying in magnitude in response to changes in the value of the temperature within the furnace. A suitable measuring system may be employed to respond to this thermocouple voltage and an optimum arrangement of such a system will include a suitable servo-motor having a shaft moving in response to the changes in the value of the temperature within the furnace.

The servo-motor can be utilized to produce a number of effects, such as, positioning a recording pen with respect to a moving chart, positioning an indicator with respect to a fixed scale, and actuating control initiating devices that will ultimately serve to regulate the quantity of heat being developed within the furnace.

In the system described so far, the measuring system, the servo system, the recording and indicating systems, and the control initiating devices would all be combined within a single housing. In other words, if substantially all parts of the process control system, with the exception of the temperature detectors and the heat regulators, were packaged into one unit the resulting arrangement would provide an extremely versatile, efficient, and flexible recording controller. For example, the recording controllers could be positioned proximate to the furnace being regulated or they could be positioned at some central location remote from the furnace, and perhaps proximate to one or more similar recording controllers provided for other processing units.

Thus, there has evolved the need for a unitary device that includes in a single supporting housing, a measuring system responsive to an electrical input quantity connected thereto from the external condition responsive detector units, a servo system connected to the measuring system and arranged to accurately follow instantaneous changes in the magnitude of the condition being controlled, a recording device for making a permanent record of all changes taking place, an indicating device for showing the instantaneous values of the condition under observation, and control initiating devices responding to any deviations of the condition from a pre-set control point.

So far, the recording controller has been described in somewhat general terms; for example, measuring systems are not always identical from unit to unit but they ordinarily are either an alternating current type or a direct current type; in a like manner, control initiating devices may be of the electric or pneumatic type; moreover, even for a controller with electric control initiating devices, there may be a variety of such devices necessary, such as, switches, slide wires, coil and vane assemblies, and the like.

Hence, a consideration of the aforegoing clearly indicates that there are many combinations of sub-assemblies that could be embodied in a single recording controller and for this reason the development and design of a standard all-purpose unit is fraught with many problems. Not only must the housing be adapted for a wide variety of locations and mounting conditions, but it must be readily adaptable for different measuring systems and control initiating devices. Moreover, when consideration is given to installation of the equipment, adjustment during use and maintenance and repair; it is vital that the design be as simple as possible and that wherever possible, all parts be readily accessible. In addition, if such devices are to be produced economically, it is obvious that parts be interchangeable wherever possible and that minimum numbers of parts be required for conversion of the basic unit from one form to another.

It is therefore one object of the invention to provide improved condition responsive apparatus that is readily adapted to a wide variety of recording and controlling applications.

It is another object of the invention to provide improved condition responsive apparatus embodying a unitary standard housing combined with indicating and recording components readily adaptable for use in a wide variety of process control systems.

It is yet another object of the invention to provide an improved recording and indicating device readily adaptable for use with a wide variety of electric control components.

It is a still further object of the invention to provide improvements in the recording and indicating components used as part of the aforesaid unitary structure.

It is also an object of the invention to provide improved electrical control components that are ideally adapted for use in a recording controller.

Briefly, in one aspect thereof, the invention comprises a rugged housing having a hinged front panel provided with a centrally disposed annular window through which may be observed the round chart and cooperating markers and pointers of a recording mechanism disposed within the housing. The recorder mechanism is arranged on the front face of an inner panel that is also hinged to the housing and the recorder driving mechanism is mounted on the reverse face of this inner panel. Also mounted on the reverse face of the inner panel are portions of a measuring system as well as portions of a servo-system. The reverse face of the inner panel is readily accessible by swinging the inner panel outwardly from the housing in which position the reverse face, the interior of the housing, and all components mounted within the housing are exposed to view and readily accessible for any adjustment or servicing required.

One or more novel cradle assemblies may also be carried on the reverse face of the inner panel to serve as supporting means for one or more electric control components. Moreover, the cradle assemblies may be rotatably mounted to permit setting of the controls from the front face of the inner panel without opening up this panel during setting.

An indication of instantaneous values of the condition being measured is provided by arranging a large, easily-read scale around the marginal edge of the outer panel surrounding the window to cooperate with a bold, centerless pointer that swings around the periphery of the recorder chart.

The recording and indicating components, as well as the inner and outer panels and housing, are all standard components readily adaptable for use in a wide variety of recording controllers, and, as will be presently seen, the electric control components are readily combined with these basic units to complete one form of recording controllers.

In other words, a line of recording controllers may be built around the aforesaid basic units resulting in a series of devices that are similar in over-all size and appearance, that have a large number of common parts which may be efficiently mass produced, and that are readily converted from one form of recording controller to another.

The benefits and advantages of the invention, together with its objects will be best understood upon reference to the detailed specification set forth below, when taken in conjunction with the drawings, annexed hereto, in which.

Figure 1:
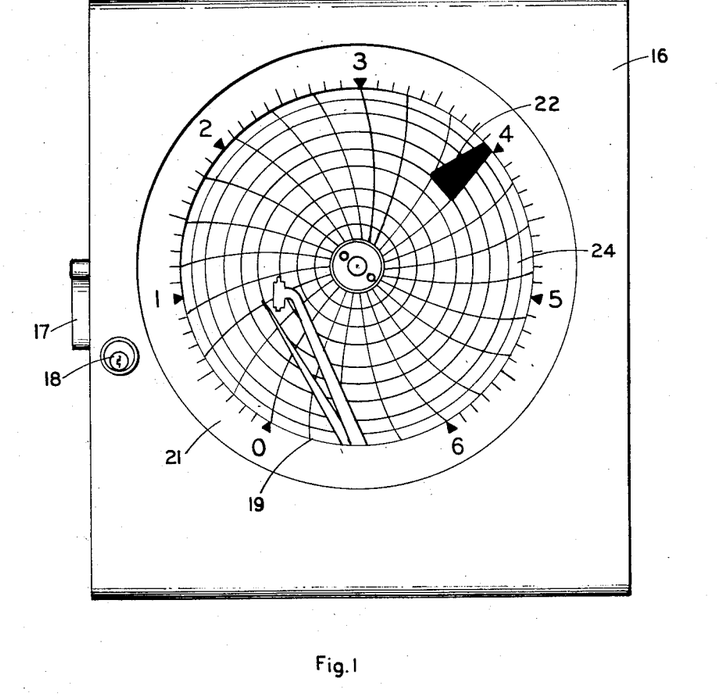
Figure 1 is a front view of a recording controller embodying the subject invention with the front panel in place in the main housing.

Referring first to Figure 1, there is shown one form of a recording controller embodying a substantially square metallic housing 15 on which is mounted at the front end thereof a swinging front panel 16 provided with a suitable latch and lock 17 and 18 respectively. The panel 16 may also be of a suitable metallic structure so that the over-all unit is extremely rugged and sturdy to permit installation or mounting a wide variety of locations.

The marginal edges of the panel may be suitably rounded to present a more attractive appearance of the device and add to the panel effect produced by the design. It is contemplated that groups of similar recording controllers could be arranged side by side to make up a panel, and the design of the unit will serve to enhance the appearance of any such composite arrangement.

The panel 16 is provided with a centrally located annular window 19 to permit ready observation of a recording and indicating mechanism mounted underneath the panel 16. Surrounding the marginal edge of the window 19 is a large indicating scale 21 provided with suitable indicia and scale markings to indicate the range of a condition being measured, and this scale cooperates with a large centerless pointer 22 arranged to swing around a circle in response to changes in the condition being measured to thereby present a large, easily read indicating device. The pointer 22 is driven by the recorder mechanism, and details of the driving arrangements will be set forth in greater detail below.

Figure 2:
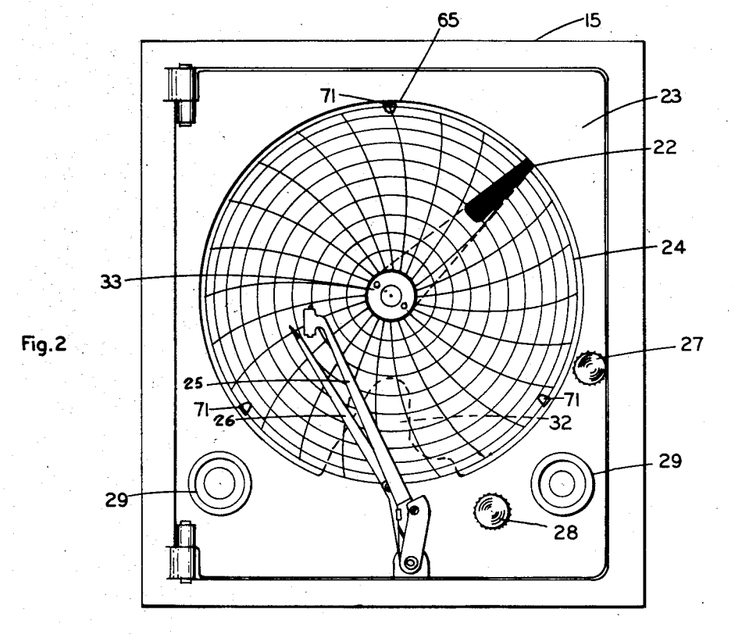
Figure 2 is front view of the device shown in Figure 1, with the front panel removed to show the front face of the inner panel.

Turning now to Figure 2, there is shown a view of the instrument shown in Figure 1 with the front panel 16 removed. The walls of the housing 15 are seen to be heavy structural members on which may be hinged at the left side thereof an inner panel 23 which carries thereon the centerless pointer 22, the condition recording chart 24, the recording pen 25, the set pointer 26, the door knob 27, the control setting knob 28, and the dummy plugs 29 arranged on opposite sides of the pen and pointer assemblies. These plugs may be easily knocked out when the recorder is to be used with pneumatic control initiating devices so that suitable pneumatic gages may be inserted in the holes covered by the plugs. However, the illustrated embodiment covers a recording controller equipped with electric control components, and for this reason the holes are shown covered by the dummy plugs 29.

Figure 3:
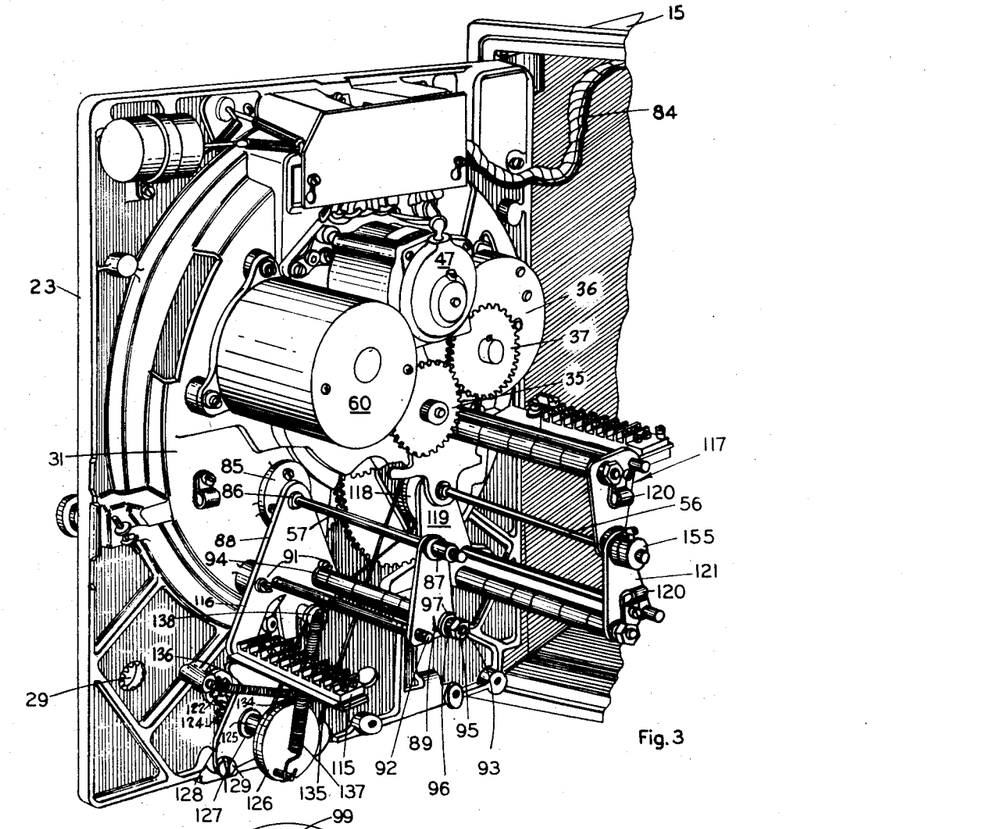
Figure 3 is a partial perspective view of the device shown in Figure 1 but with the inner panel swung open to show the reverse face and the components mounted therein.

The panel 23 is a heavy casting and is best shown in Figure 3. It has an annular table 31 projecting from its reverse face into the housing 15 and on which may be mounted various components of the recording, measuring, indicating, controlling, and servo systems forming a part of the complete recording controller. In forming the panel 23 with an inwardly projecting table 31, there is provided on the front face of the panel a suitable annular recess which may be used to house the bulk of the gear mechanism used to actuate the various parts of the equipment that move in response to changes in the condition being measured. As shown in Figure 3, a wedge-shaped portion of the table 31 is removed at the bottom thereof opposite the substantially triangular extension 32 shown in dotted lines in Figure 2, and it is on this extension that a light annular disk may be rigidly attached by suitable fastening means to serve as a combined writing and supporting table underlying the recorder chart 24. This disk member is not shown in the drawing, but it is underneath the chart shown in Figure 2. It has a centrally located aperture to receive therethrough the circular plate 33 forming a part of the chart driving mechanism. This plate 33 is more clearly shown in Figures 4 and 6 and is coupled to the chart driving shaft 34 extending centrally through the panel 23, being journaled therein, and terminating in the gear 35 which is interconnected to the chart driving motor 36 by means of the gear 37. The motor 36 may be a conventional electric motor of the type used to drive electric clocks, so that the chart recorder is rotated in a properly timed manner. Motor 36 is rigidly attached to the table 31 and has its shaft passing through a suitable aperture provided in the table for this purpose.

Figures 4, 5, 6:
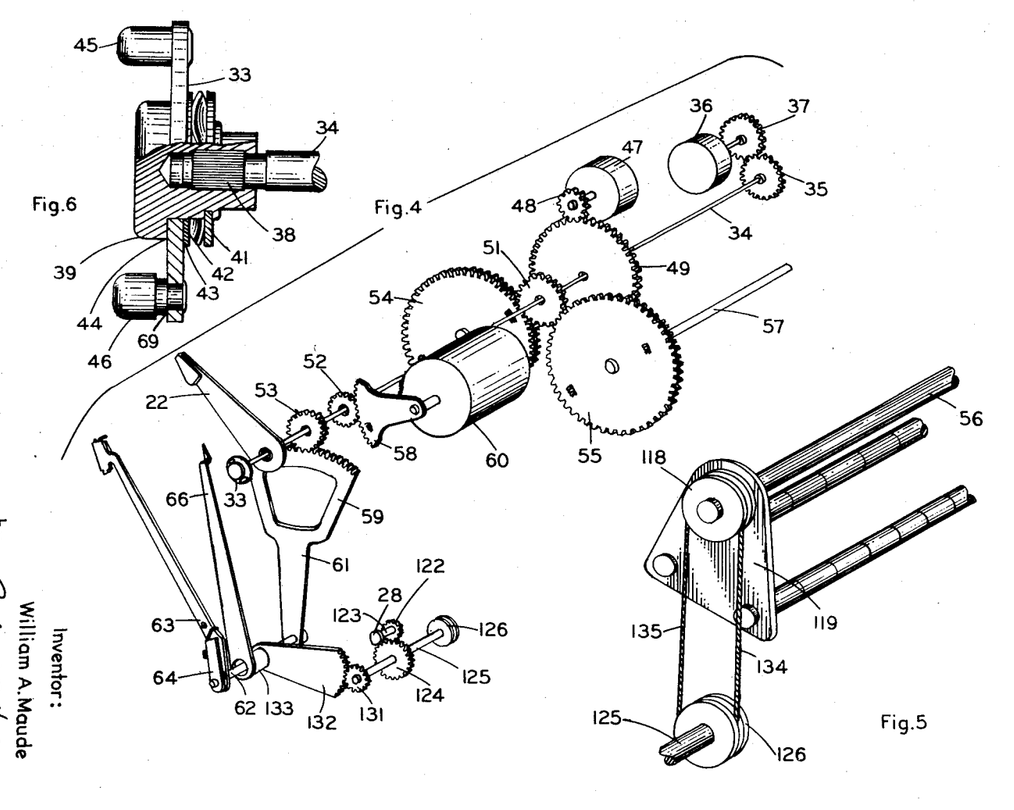
Figure 4 is an exploded view of the driving and driven components of the device, together with portions of the gear train used.
Figure 5 is an enlarged partial view of a control supporting cradle assembly and associated positioning components.
Figure 6 is an enlarged view, partially in section, of the recorder chart holding means and driving shaft.

Looking at Figure 6, it is seen that the shaft 34 is provided with a knurled section 38 over which is pressed the hub 39 on which is staked an annular washer 41. An annular spring washer 42, clutch washer 43, and plate 33 are clamped between the washer 41 and the shoulder 44 provided in hub 39 so that the plate 33 is driven by the shaft 34 through the simple clutch arrangement illustrated. Normally, there will be no slippage between the shaft 34 and the plate 33, but in the event that it is desired to position the chart manually, the plate 33 can be turned through the clutch, and spring 42 will yield to permit such manual manipulation of the chart drive. Any manual positioning of the chart can easily be accomplished by gripping the pins 45 and 46 which are staked to the plate 33. As will be seen further and in greater detail below, these pins operate to hold the chart in place and drive it at the same time.

Referring again to Figure 4, which is a somewhat schematic arrangement of portions of the driving mechanisms for various components of the recording controller, it is seen that a servo motor 47, which is rigidly mounted on the table 31, has a pinion 48 rigidly secured to its shaft. Like the shaft of the chart driving motor 36, the shaft of motor 47 extends through an aperture provided in table 31 for this purpose. This pinion drives gear 49 which is concentrically journaled with respect to shaft 34 and has integrally affixed thereto a cluster of gears comprising the pinions 51, 52, and 53. Although the gear 49 and its associated pinions are shown spaced apart in the exploded diagram of Figure 4, it is to be understood that they are side by side when mounted within the recess provided by the table 31.

A pair of large gears 54 and 55 may be arranged on opposite sides of pinion 51, and these gears will have attached thereto respective cam shafts 56 and 57 which extend outwardly from the table 31 and form part of the electric control cradles to be described in greater detail below. Meshing with pinion 52 is a sector gear 58 which in turn is connected to a balancing device 60 forming a part of the measuring system. Meshing with pinion 53 is a sector 59 which has an elongated shank 61 extending downwardly, on the extremity of which is affixed the pen shaft 62 suitably journaled in the plate 23 and extending through the plate to the front face where it is affixed to the recording pen assembly 63. This recording pen assembly may be provided with a suitable spring-loaded, over-travel connection to permit manual positioning of the pen, particularly in those instances wherein it is desirable to change charts.

The centerless pointer 22 is also a part of the gear cluster comprising gear 49 and pinions 51, 52, and 53, such that it turns with the recording pen in response to changes in the condition being measured. Referring back to Figures 1 and 2, it is to be noted that the centerless pointer swings around the periphery of the recorder chart 24 and travels in the space 65 provided between the panel 23 and the disk which underlies the chart 24.

For an understanding of one form of measuring system suitable for use with the aforementioned recording mechanism, attention is directed to U.S. Patent No. 2,645,748 issued July 14, 1953, in the name of A. Hansen, Jr. Without going into all of the details which are clearly set forth in the Hansen patent, it is sufficient to point out that servo motor 22 in the Hansen patent corresponds to servo motor 47 in the instant application. It is also pointed out that the balancing unit 60 corresponds to balancing unit 20 of the aforementioned Hansen patent.

Concentrically mounted with the recorder pen shaft 62 is a set pointer 66 which is adapted to be positioned by manipulation of the set pointer knob 28 so that a visual indicator is provided to cooperate with the chart 24 to indicate the value of the condition that the recording controller will maintain in equipment being controlled thereby. This set pointer is a part of the control components that are mounted on the reverse face of panel 23, and its precise manner of operation will be described in greater detail below.

Referring now to Figures 1, 2, 6, and 15, it is to be noted that the chart 24 is provided with a centrally located aperture 67 through which hub 39 projects. On opposite sides of this aperture, there may be arranged a pair of elongated holes 68 that are positioned so that they will pass over the pins 45 and 46. Pin 45 may be conveniently designated as a driving pin, and pin 46 may be conveniently designated as a holding pin. The holes 68 are dimensioned so that the chart fits snugly around driving pin 45 and is driven thereby in response to motion of the chart driving shaft 34. The holding pin 46 has its outer extremity larger in diameter than the width of the slot 68, but it has a shallow undercut portion 69 adjacent to the plate 33. When the chart paper is pushed over this pin, the edges of the slot are deformed until the paper is pressed down to the base of the pin at which point the deformed portion will snap into the undercut portion 69. The overlapping shoulder of the undercut portion will be sufficient to keep the chart paper on the plate 33 and prevent it from falling away from this plate under its own weight, but this confining shoulder will not prevent the chart paper from being readily lifted away from the pin. To assist in holding the chart in place, a plurality of small holding clips 71 (affixed to the chart writing table) may be spaced about the peripheral edges of the chart.

Figure 15:
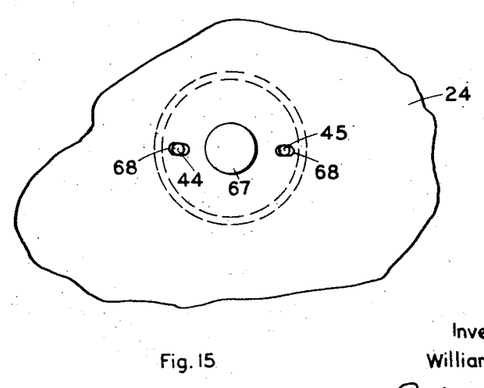
Figure 15 is a partial view of a recorder chart and a driving and holding mechanism of the type shown in Figure 6.

As decribed above, the pins 45 and 46 may be readily grasped, much in the same manner that a clock key would be grasped to wind a clock, to rotate the chart until the recorder pen is on the proper time line of the chart.

Figure 7:
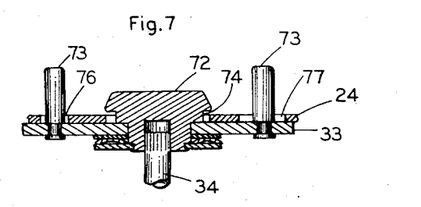
Figure 7 is a partial sectional view of a modified form of chart holding means.
Figure 8:
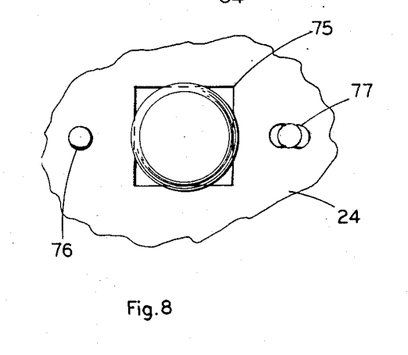
Figure 8 is a front view of the arrangement shown in Figure 7, including a portion of a chart to illustrate the coaction between the parts.

Modified chart holding arrangements are shown in Figures 7, 8, 9, and 10; and referring first to Figure 7, it is seen that the basic arrangement is much the same as aforesaid with the exception of the configuration of the pins and the hub. Thus, shaft 34 has the hub 72 pressed over its knurled end, and the assembly also includes the plate 33 and associated clutch. A pair of equal diameter driving pins 73 may be riveted to the plate 33, and instead of undercutting one of these pins as shown in Figure 6, the hub 72 is provided with an undercut portion 74 in that part thereof which is adjacent to plate 33. The hub 72 is also tapered away from the front face, and as shown in Figure 8, the chart paper is provided with a square hole 75 at its center, having sides that are shorter in length than the largest diameter of the hub. Also positioned on the chart paper are two other holes, one of them being round shown as 76 and adapted to fit snugly around one of the driving pins 73. The other hole 77 is elongated, and its narrow section fits snugly over the other drive pin 73. It is to be noted that the pins 73 project outwardly from the plate 33 a greater distance than the outward projection of hub 72.

When placing a chart on the recorder, the holes 76 and 77 are first picked up by the pins 73, and as the paper is pushed over these pins, the center hub picks up the square hole in the chart paper. As the paper is pressed over the tapered portion of the hub, the paper surrounding the hub is distorted to permit the square hole to snap over the larger diameter section of the hub and into the undercut portion 74. The larger diameter portion serves to prevent the paper from moving away from the chart plate. In this modification the center hub serves to retain the chart paper in place, whereas the two pins serve to locate and drive the chart. It is to be noted that the center hole need not be formed as a square, but it could have any number of sizes either regular or irregular. That is, it could be triangular in shape, or it could be oval, or it could have a shape that is a variation of a triangle or an oval.

Figure 9:
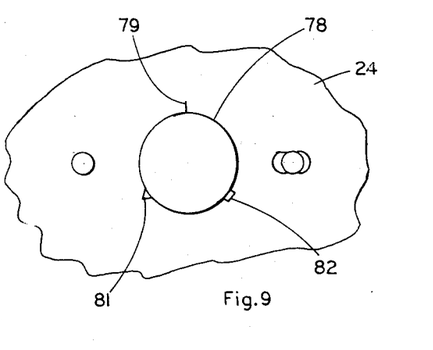
Figure 9 is another form of chart intended to coact with the holding means shown in Figure 7.

In Figure 9 there is shown another form of chart 24 having its central hole in the form of a circle 78, whose diameter is less than the largest diameter of the hub 72. This chart is intended to cooperate with the driving and holding arrangements shown in Figure 7. Now to enable the paper to deform and slip over the enlarged hub portion, a plurality of slits 79 could be provided around this periphery, or in lieu of slits a plurality of triangular cut-outs 81, or rectangular cut-outs 82 could be provided. Placement of the chart would be the same as before, and the center hub would serve to retain the chart in position, whereas the pins would serve to locate and drive the chart.

Figure 10:
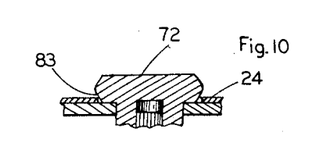
Figure 10 is a partial sectional view showing a modified version of the hub member forming a part of the chart holding means.

In Figure 10 there is shown a modified form of the hub shown in Figure 7 wherein the undercut portion 74 is eliminated and replaced by an inwardly tapered portion 83. For certain dimensions of the chart hole as compared with the enlarged portion of the hub, this last modification might enable the chart to be installed and removed with a minimum possibility of damage through tearing.

From the above it is seen that the inner panel 23 is provided with a complete recording device and also carries a so-called centerless indicator that will cooperate with the scale arranged on the outer panel to produce a large, easily read indicator of instantaneous values being traced by the recorder pen. The chart driving motor and the pen driving motor are permanently mounted on the reverse face of the inner panel, and along with the recording and indicating devices, comprises standard components of a complete recording controller. It is only necessary that suitable connections be brought to these driving motors, and as best seen in Figure 3, this can be done quite simply by wrapping all of the necessary lead wires together, thereby forming them into a flexible cable 84 which does not prevent or interfere with opening of the panel for any necessary adjusting or servicing of the components mounted thereon. In addition, ample space is provided on table 31 for mounting thereon suitable balancing units, one form thereof being of the type shown in aforesaid Hansen patent. Other forms of balancing units could be substituted for the type shown, if the measuring system is changed from the D.-C. type shown in the Hansen patent to some form of suitable A.-C. system. In other words, by the simple substitution of balancing units and without making any additional changes to the components carried by panel 23, the recording controller could be adapted to respond to any selected measuring system. Of course, it is to be understood that such systems are carried within the housing 15 and are suitably mounted therein. One contemplated design would be to have the measuring system in the form of plug-in units that can be conveniently installed or removed as desired, thus facilitating manufacture thereof.

Considering now the control components adapted to be carried by the panel 23, reference will first be had to Figures 3 and 5, wherein it is seen that the basic supporting structure for any control components comprise a series of shafts arranged in triangular fashion between suitable supporting plates. These supporting arrangements may be conveniently referred to as control cradles and are adapted to receive a plurality of control components side by side thereon.

Referring first to the single-control cradle shown in Figure 3, it is seen that one of the shafts of the cradle comprise the cam shaft 57, which, as aforesaid, has its inner end affixed to the gear 55 lying within the inner recess provided under the table 31. A suitable clearance hole is provided in the table through which the shaft 57 passes. The cam shaft also passes through a spacer 85 and is journaled for rotation in inner and outer bearings 86 and 87, respectively. These bearings are rigidly secured to corresponding inner and outer support plates 88 and 89 and, as best illustrated by bearing 87, the bearings project a slight distance outwardly from the plates and have the outer surfaces of these projections machined to a smooth finish for a purpose to be described in more detail below.

The inner plate 88 is rigidly secured to the table 31 by suitable screws 91 or the like and is provided with a pair of spaced apertures through which extend a pair of posts 92 and 93. The inner ends of these posts may be rigidly attached to the plate 88, by staking, or by some other suitable means, and the outer ends pass through a pair of spaced apertures provided in the plate 89. Suitable spacer sleeves 94 are provided around post 93, and these sleeves serve to space the end plates and also serve to space any control components mounted on the cradle. The outer plate 89 is held in place by means of a nut 95 which threadably engages the outer end of post 93 and may be tightly turned against a washer 96 and collar 97 also mounted on the post between the nut and the plate. Once the nut is tightly secured in place, the control cradle is complete. To mount control components, it is only necessary to remove the nut 95, take off the plate 89, and then slide the control components over the posts and cam shaft.

Figure 11:
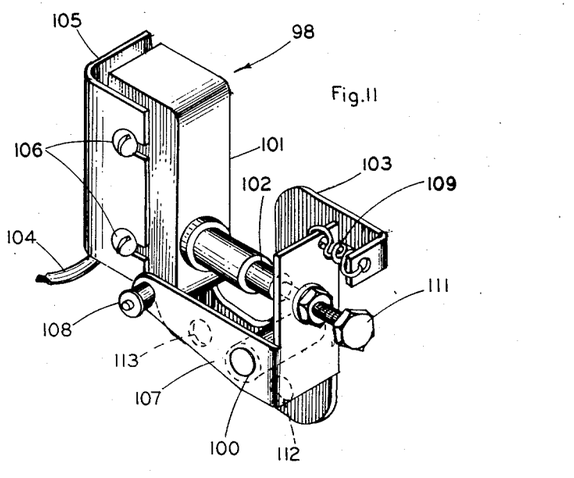
Figure 11 is a perspective view of an electric control switch adapted to be mounted in the cradle shown in Figure 5.
Figure 16:
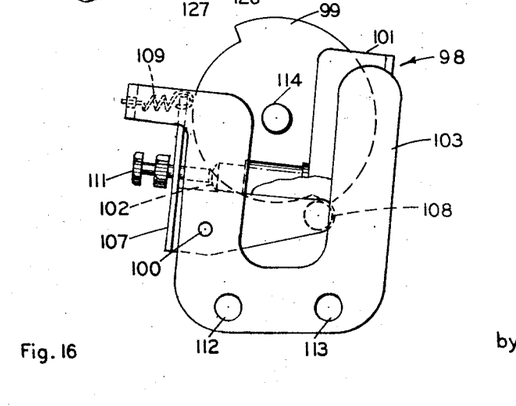
Figure 16 is an end view of an electric control switch and its associated cam, with certain parts removed, illustrating the relative position of these control components when mounted on a control cradle.

To see how this control cradle functions, reference will now be had to Figures 11 and 16 wherein are shown two views of a snap-action switch control initiator 98 and its associated actuating cam 99. It is to be noted that in Figure 16 parts of the switch assembly have been omitted and parts have been cut away to better illustrate the action of the switch and its associated cam. Looking first at Figure 11, it is seen that the switch comprises an oblong housing 101 in which is contained a suitable snap-action electrical control switch mechanism. Such mechanisms are well known in the art, and for the sake of brevity will not be discussed in detail herein. Suffice to say that suitable contacts can be caused to make or break, with a snap-action, upon actuation of the switch plunger 102. The switch is mounted on a U-shaped bracket 103 and may have suitable leads connected thereto, one of which is shown at 104. An insulation shield 105 is attached to the switch housing by screws 106 or the like.

The switch plunger 102 is actuated by a cam follower arm 107 pivoted at 100 in one end of which is a cam follower in the form of a roller 108. A spring 109 connected between a portion of bracket 103 and the other end of the cam follower arm normally biases the arm away from the plunger 102. Actual contact between the cam follower arm 107 and plunger 102 is provided by the screw 111 adjustably mounted on arm 107. The screw 111 may be moved slightly in either direction to provide a micrometer adjustment of the control point.

The bracket 103 is provided with a pair of spaced apertures 112 and 113 through which the posts 92 and 93 are adapted to pass when the control switch is mounted on the control cradle. The cam 99 has a central aperture 114 through which the cam shaft 57 passes and the cam is clamped on this shaft in any predetermined position by means of set-screws (not shown) carried by a suitable apertured hub (not shown) that may be staked to the cam. It is to be noted that the cam is positioned right along side of the switch to achieve a very compact arrangement of parts.

The cam rise will cooperate with the cam roller 102 to turn the cam follower arm 107 downwardly about its pivot 100 to depress the switch plunger and actuate the switch. So long as the cam rise bears down on the cam roller, the switch will have one control position. When the condition being controlled changes to bring the cam fall around to the cam roller, the switch will be actuated to its alternate control position. To change the control point, it will only be necessary to change the position of the cam on its driving shaft, and this can be done quite easily by opening up the recording controller, loosening the set-screws, moving the cam, tightening the set-screws, and then closing up the apparatus. Of added advantage is the fact that standard switch components that are commercially available can be readily used as a control component. Moreover, a number of such switches may be carried on one control cradle.

The control cradle described above is commonly referred to as a back-set control unit, in that the instrument must be opened up to get at the control components and change their setting. To accommodate any lead wires coming from the switch or other control components, the cradle is provided with a suitable terminal board 115 mounted on an extended portion 116 of the inner support plate 88, and from this terminal board the lead wires may be suitably brought over to cable assembly 84 and combined therewith to bring them away from the panel out to any appropriate terminals to which may be connected the leads from any control units that are connected to the switch.

Looking now at the double control cradle shown in Figure 3, it is to be noted that the upper cradle 117 is identical to the single control cradle described above except that its spaced control carrying posts have been rotated approximately 180 degrees before being permanently mounted on the table 31. As with the single control cradle, the cam shaft 56 for the double cradle extends through a clearance hole in table 31 and is journaled in the bearings provided in the upper cradle end plates. However, unlike the single cradle, the collar 85 has been eliminated and in its place has been substituted a sheave 118 rigidly attached to the inner plate 119 of lower control cradle and journaled for rotation on the smooth outer bearing surface of the inner bearing supporting cam shaft 56. The inner plate is provided with a bearing so that it is also journaled for rotation such that it can rotate about the shaft 56 upon rotation of sheave 118. In all other respects, the upper cradle 117 is identical with the single control cradle and will function in an identical manner.

Examining further the lower cradle, it too has a pair of spaced posts staked to its inner plate 119 and extending outwardly such that its outer ends coact with the outer lower plate 121 in a manner similar to the other cradles. This outer cradle plate is provided with a bearing turning on the smooth bearing surface of the outer bearing supporting the cam shaft 56 so that this plate is also rotatable about the shaft 56. Hence, the lower control cradle is rotatably mounted with respect to cam shaft 56, and since this cradle may also carry control components, it is obvious that the control point of such components can be changed by rotating the cradle without disturbing the setting of any cams mounted on shaft 56. As with the fixed cradles, the rotatable cradle also has a terminal board carried by its inner plate and both cradles of the double unit may have the plastic lead wire clips 120 attached thereto to aid in supporting and guiding any lead wires used with the control components.

The advantages of the aforesaid arrangement are readily apparent in that a pair of control components may be mounted opposite to one another on the upper and lower cradles such that a common cam actuates both components. The control point of the upper control unit may be changed by moving the cam and the control point of the lower component may be changed by moving the lower cradle. This latter adjustment does not change the control point of the upper components but only affects any control components mounted on the lower cradle.

The aforesaid arrangement ideally lends itself to a construction wherein the lower cradle has its position adjusted from the front face of panel 23 and the control components mounted on the rotatably mounted cradle thus become known as front-set control components. The manner of accomplishing this front setting is shown in Figures 3 and 4 and 5 wherein the knob 28 is interconnected to sheave 118 such that rotation of the knob will cause rotation of the sheave and its attached lower cradle. In Figure 4, the schematic arrangement illustrated shows the knob 28 journaled for rotation and carrying therewith a pinion 122 which is mounted on shaft 123 extending through a suitable bearing provided in the panel 23. The pinion 122 meshes with a gear 124 rigidly affixed to a shaft 125 on which is also attached a driving sheave 126. Shaft 125 is carried by a bearing 127 mounted in an auxiliary support plate 128 affixed to the reverse face of panel 23 by suitable screws 129 or the like. A smaller gear 131 is contiguous to gear 124 and is attached thereto (although shown separated in the exploded view of Figure 4) and meshes with a sector 132 journaled for rotation about the pen shaft 62 and having a hub 133 coaxial therewith. This hub extends through a suitable clearance hole provided in panel 23 and has affixed to its outer extremity the set pointer 66.

As shown in the simplified, substantially schematic illustration of Figure 5, the driving sheave 126 is connected to driven sheave 118 by means of a pair of flexible cables 134 and 135. Although giving the appearance of a continuous cable, the two cables are physically separated and each has its opposite ends securely attached to sheaves 118 and 125. A direct, positive drive results from this arrangement so that any rotation of the knob 28 is carried through to the rotatably mounted control cradle. Since the set pointer moves with the cradle, the knob 28 may be turned to any control point indicated by the set pointer 66 and one using the instrument will know with assurance that the cradle has followed the set pointed to the new control point selected.

In the set point driving arrangements, spring 136 serves to eliminate any backlash in the gearing and the spring 137, which has one end connected to sheave 126 and its other end connected to a stud affixed to table 31, is provided to counter-balance the weight of the rotatable cradle. A spring loaded cable tension arm has its head 138 showing in contact with cable 134.

The coaxial arrangement of the set-pointer shaft and recorder pen shaft enhances the readability of both the set pointer and the recorder pen and also is an ideal arrangement for a recording controller equipped with pneumatic controls. In connection with pneumatic controls, it is interesting to note that the double cradle may be eliminated and the space normally occupied thereby may be used to mount pneumatic control components thereon. However, the single cradle may remain in place and carry thereon any number of electrical control components in addition to whatever pneumatic control devices are used.

Most of the parts of the single and double cradles are interchangeable; for example, the end plates, the posts, the spacers, mounting screws, terminal boards, bearing structures, are all alike for all cradles. For the rotatable cradle, a different bearing is used, but in all other respects the cradles are identical. Obviously, such part identity and interchangeability enhances the simplicity of the unit and facilitates its economical manufacture.

Figure 12:
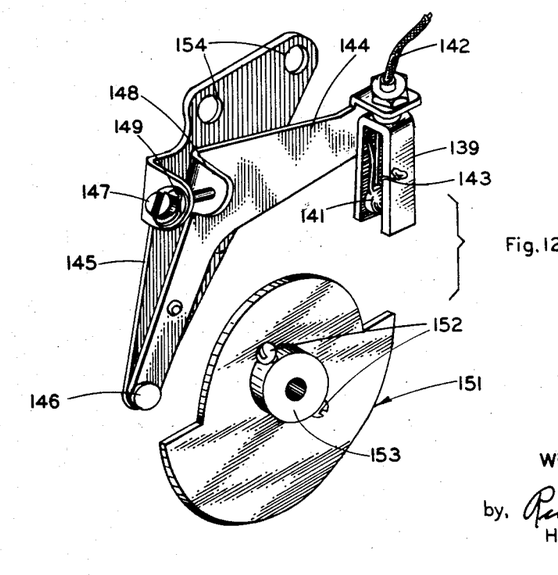
Figure 12 is a perspective view of another form of electric control component adapted to be mounted in the control cradle, showing in this instance a coil and vane assembly.

For an understanding of another form of electric control component that may be used with the aforesaid control cradles, reference will now be had to Figure 12 wherein is shown a coil and vane assembly useful in a control system of the type shown in U.S. Patent No. 2,584,728 issued February 5, 1952, to P. C. Michel. In the Michel patent the coil assembly is shown in Figure 2 and the vane is indicated schematically as part 17 in Figure 1. Whenever the vane 17 moves between the coils 15 and 16, a control action is initiated through the operation of the associated electronic circuits. In Figure 12, a U-shaped bracket 139 carries the coil assembly, one of which is shown at 141 having suitable lead wires 142 connected thereto. The ground potential connection corresponding to the Michel arrangement is shown by the wire 143 connected to the bracket by soldering or the like.

Bracket 139 is carried by arm 144 which in turn is carried by the mounting bracket 145. Arm 144 may be pivotally mounted on bracket 145 through a stiff-frictional pivot 146. Micrometer adjustment of the position of arm 144 is provided by the screw 147 mounted on an inturned ear of bracket 145 such that the inner end of the screw cooperates with an ear 148 provided in arm 144. A spring washer 149 holds the screw in any preset position. The vane 151 is much like a cam and is adapted to be mounted on one of the cam shafts of a control cradle by means of the set screws 152 mounted in the apertured cam hub 153. The bracket 145 has suitable spaced apertures 154 to cooperate with the mounting posts of a control cradle.

The operation is thus apparent, in that the vane 151 will rotate in response to changes in magnitude of the condition under control, and when the vane moves through its control point whereby the rise of the vane passes through the coils, suitable control action will be initiated. When coil and vane components are used on the cradles, a collar 155 may sometimes be affixed to the cam shaft to maintain proper positioning of such units in that the collar will serve to minimize possible end-play of the cam shaft.

Figure 13:
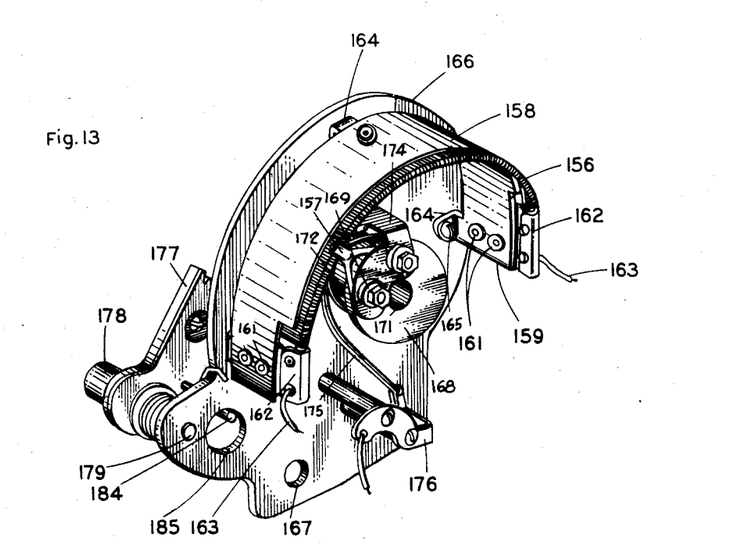
Figure 13 is a perspective view of one side of an electric control component in the form of a slidewire assembly adapted to be mounted on the control cradle.
Figure 14:
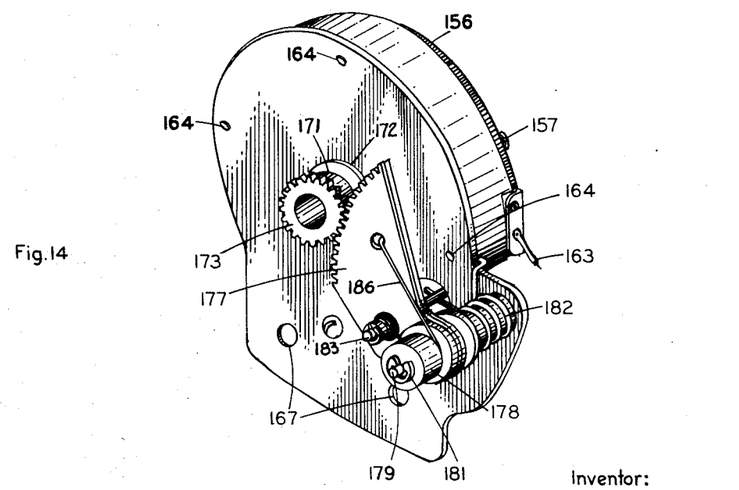
Figure 14 is another perspective view of the other side of the arrangement shown in Figure 13.

Another form of control component is shown in Figures 13 and 14, comprising a linear potentiometer in the form of an arcuate slide wire assembly 156 on whose edge rides a wiper contact, 157. The slide wire is wound about a substantially semi-circular form that is secured between a pair of semi-circular insulating supports 158, 159 by means of suitable rivets 161 or the like. The slide wire has the terminals 162 at its opposite ends to which may be affixed, in any known manner, suitable electrical leads 163.

The inner slide wire support 159 may have a plurality of spaced apertured ears 164 adapted to cooperate with suitable screws 165 so that the slidewire assembly may be rigidly secured to a supporting bracket 166. The bracket 166 has suitable spaced apertures 167 to permit mounting thereof on the supporting posts of either the front-set or back-set control cradles.

Cooperating with the slidewire is the rotatably mounted wiper 157 which may comprise a conducting arm mounted on a hub 168 (but insulated therefrom) by a pair of screws 169. The holes in the base of the wiper through which the screws 169 extend may be slightly elongated to permit some degree of adjustment in the mounting of the wiper. The hub is rigidly attached to one end of a hollow shaft 171 that passes through a stationary sleeve 172 that is rigidly affixed to bracket 166 and extends therethrough on both sides thereof. The shaft 171 has a pinion 173 attached to its other end and when this pinion is rotated, the hollow shaft 171 will rotate in the bearing sleeve 172 to move the wiper 157 along the edge of the slidewire. The base of the wiper has the terminal ear 174 to which may be soldered one end of an external lead wire 175 that is loosely wound around sleeve 172 and has its other end connected to a terminal clip 176 mounted on bracket 166 from which the lead wire may be taken to the terminal board of the cradle. This construction permits the lead wire to wind and unwind as the wiper moves.

To rotate the pinion 173, a split sector gear 177 is pivotally mounted with respect to bracket 166, being provided with an elongated bearing hub 178 surrounding a stud shaft 179 rigidly affixed to bracket 166. A suitable E-washer 181 holds the sector hub on the shaft 179, and a coil spring 182 is so connected between the sector and the bracket as to normally bias the wiper 157 to one end of the slidewire.

To move the sector, a cam follower in the form of a roller 183 is mounted on the sector and this follower is driven by a suitable cam (not shown) similar to that shown in Figure 16, mounted on the cam shaft of a control cradle and driven by the servo motor. A stop pin 184 is affixed to the sector assembly to cooperate with an aperture 185 provided in bracket 166 to limit travel of the sector in either direction. The spring 186 is used to take up the backlash in the split sector gears.

In operation, the spring 182 biases the wiper and holds the cam follower against its associated cam. Rotation of the cam may cause rotation of the sector which in turn will cause motion of the wiper. The action taking place may thus be described as a proportioning action, in that the wiper may be caused to move from one end of the slidewire to the other while the recording pen moves through but a fraction of its total motion. The fraction may be determined by the shape of the cam used and may be changed by using a variety of cams of varying shapes. When this control is mounted in the front-set cradle, the control band of the slidewire may be changed in position by rotating the slidewire about the cam. As said above, the width of the control band may be changed by changing the cam. As in previous control units, the parts are located close together to form a compact assembly.

If a proportioning drive is not necessary for the particular control system being used, the wiper can be arranged to be driven directly by the cam shaft, in which case the slidewire component is materially simplified. Such a design would contemplate motion of the wiper from one end of the slidewire to the other corresponding to full travel of the recorder pen.

Throughout the assembly, it is to be noted that backlash in many of the gears—for example, gears 49, 54, 55, 58, and others—may be eliminated by the use of gearing arrangements illustrated in U.S. Patent No. 2,092,888, issued September 14, 1937, to I. H. MacCoul.

From the aforegoing, it is seen that the panel 23 embodies a number of basic components of a recording controller, these components being readily adaptable for a wide variety of measuring or control systems connected thereto. Compactness and neatness have been achieved without sacrificing accessibility, visibility, and readability. Installation, adjustment, and servicing are greatly facilitated, and conversion from one control system to another is readily accommodated. Additionally, part interchangeability and duplication have been utilized wherever possible to achieve economy of manufacture.

Therefore, while particular embodiments of the subject invention have been shown and described herein, these are in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. Condition responsive apparatus, comprising, in combination: an instrument housing; a pivotally mounted front panel for said housing, said front panel having a centrally located circular window around the periphery of which is a large easily-read substantially circular indicating scale; a pivotally mounted inner panel within said housing and lying behind said front panel, said inner panel having a centrally located circular recessed portion in its surface which faces the front of said housing, said recessed portion forming a circular table on its other surface which projects into the interior of said housing; said circular window, said circular scale, and said recessed portion being disposed in concentric relationship to one another; a circular chart rotatably mounted concentrically within said recessed portion and arranged so that its marking surface is substantially flush with the surrounding portions of said inner panel, said chart having a diameter less than the diameter of said scale and having its peripheral edge spaced from said surrounding portion of said inner panel to define a gap therebetween; a chart driving motor mounted on said table having driving connections to said chart; a chart marker mounted on said inner panel and arranged to move substantially radially across the marking surface of said chart in response to changes in said condition; a pointer rotatably mounted in said recessed portion behind said chart, said pointer having its outer end extending through said gap and bent around the edge of said chart such that a portion of said pointer overlies said chart and is visible through said window, said visible portion being formed as a substantially arrow-shaped member which points toward said indicating scale, said pointer having its axis of rotation concentric with the axis of said scale whereby said arrow-shaped member may cooperate with said scale to form an indicator; control initiating components mounted on said table and having parts which move to actuate said components; and driving means mounted on said table which respond to changes in said condition and are connected to simultaneously drive said chart marker, said pointer, and said control component actuating parts.

2. Condition responsive apparatus, comprising, in combination: an instrument housing; a vertically disposed front panel mounted on said housing, said front panel having a centrally located circular window around the periphery of which is a large easily-read substantially circular indicating scale; a vertically disposed inner panel within said housing lying behind said front panel, said inner panel having a centrally located circular recessed portion in its surface which faces the front of said housing; said circular window, said circular scale, and said circular recessed portion being disposed in concentric relationship to one another; a circular chart rotatably mounted concentrically within said recessed portion, said chart having a diameter less than the diameter of said scale and having its peripheral edge spaced from the surrounding portion of said inner panel to define a gap therebetween; a chart driving motor mounted on the rear surface of said inner panel having driving connections to said chart; a chart marker mounted on said inner panel and arranged to move across the marking surface of said chart in response to changes in said condition; a pointer rotatably mounted within said recessed portion behind said chart, said pointer having its outer end extending through said gap and bent around the edge of said chart such that a portion of the pointer overlies said chart and is visible through said window, said visible portion being formed as a substantially arrow-shaped member which points toward said indicating scale, said pointer having its axis of rotation concentric with the axis of said scale whereby said arrow-shaped member may cooperate with said scale to form an indicator; control initiating components mounted on said rear surface of said inner panel and having parts which move to actuate said components; and driving means mounted on said inner panel rear surface which responds to changes in said condition and is connected to simultaneously drive said chart marker, said pointer, and said control component actuating parts.

3. The combination defined by claim 2 wherein said chart marker moves substantially radially across said chart from an initial position near the center of said chart to a final position near an edge thereof as the magnitude of said condition increases to a maximum value, and said arrow-shaped member correspondingly sweeps around the edge of said chart from an initial position proximate to said final position of said chart marker to a final position remote therefrom whereby at any value of said condition said chart marker and said arrow-shaped member do not interfere with one another.

References Cited in the file of this patent

UNITED STATES PATENTS

| | | |
|---|---|---|
| 677,674 | Manning | July 2, 1901 |
| 2,124,832 | Schofield | July 26, 1938 |
| 2,307,912 | Bean et al. | Jan. 12, 1943 |
| 2,423,479 | Caldwell | July 8, 1947 |
| 2,541,299 | Shannon | Feb. 13, 1951 |
| 2,719,293 | Hornbruch et al. | Sept. 27, 1955 |
| 2,746,832 | Blakslee | May 22, 1956 |